United States Patent

[11] 3,630,808

| [72] | Inventor | Shinjiro Yasui<br>No. 37-3 Aza Higashioka, Wassanu-chg,<br>Kamikawa-gun, Hokkaido, Japan |
|---|---|---|
| [21] | Appl. No. | 637,493 |
| [22] | Filed | May 10, 1967 |
| [45] | Patented | Dec. 28, 1971 |

[54] APPARATUS FOR JOINING SHEET MATERIALS BY VIBRATING PLATES
5 Claims, 14 Drawing Figs.

[52] U.S. Cl............................................ 156/580, 156/73, 156/507, 29/470.3
[51] Int. Cl............................................ B30b 15/34, B29c 27/08
[50] Field of Search................................. 156/580, 556, 507; 29/470.3

[56] References Cited
UNITED STATES PATENTS

| 2,675,838 | 4/1954 | Hickok et al. | 156/556 X |
| 2,774,700 | 12/1956 | Killington | 156/580 X |
| 3,150,022 | 9/1964 | Vida | 156/556 X |
| 3,255,067 | 6/1966 | Sontheim et al. | 156/556 X |
| 3,442,735 | 5/1969 | Stensaker | 156/580 X |
| 3,444,030 | 5/1969 | Henley | 156/507 |

*Primary Examiner*—Benjamin A. Borchelt
*Assistant Examiner*—J. J. Devitt
*Attorney*—Wenderoth, Lind & Ponack ABSTRACT: The disclosed apparatus for joining sheet materials by vibrating plates has belt conveyors for continuously feeding the sheet materials carrying to be joined, a vibrating device for vibrating the sheet materials and whereby they are joined and also belt conveyors for removing the joint materials. The vibrating device has a resonant heating plate, a vibrating plate, resilient supporting member and a vibrator. The vibrating plate and the resonant plate are heated by a heating device and transfer heat to the sheet materials.

APPARATUS FOR JOINING SHEET MATERIALS BY VIBRATING PLATES

BACKGROUND OF THE INVENTION

This invention relates to an apparatus for joining sheet materials by means of vibrating plates, and more particularly is directed to an apparatus for continuously joining sheet materials by means of vibrating and heating plates.

Heretofore, in the conventional plywood manufacturing field, there has been known a method of joining several sheets of narrow width each other in order to make a wide sheet. In this method the narrow sheets are joined by gummed tape or a splicer. According to the method, there has been required considerable time for removing the gummed tape, finishing the surface of the joined section etc., or there has been a great loss of materials when the sheet is cut to a predetermined size. For these reasons, an apparatus for joining continuously sheet materials has been studied and developed. However, until now, no such apparatus has been developed which produces sheets of desired strength without requiring a time-consuming finishing operation.

SUMMARY OF THE INVENTION

This invention eliminates the above-mentioned disadvantages of the conventional apparatus for joining sheet materials and provides a novel apparatus for continuously joining sheet materials by the vibrating technique.

According to one aspect of this invention, there is provided an apparatus for continuously joining sheet materials by means of vibrating plates having means for continuously feeding the sheet materials to be joined, a vibrating device for vibrating the sheet materials and which contains a plurality of resonant plates, which are secured directly or through elastic supporting means to frames, a vibrating plate, which is supported by a resilient member mounted to the frame and generally disposed in parallel with the resonant plates, a resilient supporting member, a vibrator, and a heating device. The distance between the resonant plates and the vibrating plate is adjustable responsive to the thickness of the sheet material, whereby the resistance to movement of the sheet material is varied, thus insuring that the sheet materials remain in tight contact relation.

According to another aspect of the present invention, there is provided an apparatus for joining continuously sheet materials by means of vibrating plates having the aforesaid apparatus, and in addition, having a plurality of means for separating the vibrating operation of the vibrator from the ground, wherein the vibrating plate is secured to the frame for supporting the vibrator by suitable means such as springs or welding. Also a predetermined number of the resonant plates are formed as rectangles with smaller rectangular tails at both sides, such plates being disposed adjacent to each other so as to press uniformly on the surface of the sheet materials. Alternatively a predetermined number of the resonant plates are formed as rectangles with a smaller rectangular tail at one side, a plurality of such resonant plates being disposed adjacent to each other to press uniformly on the surface of the sheet materials.

According to a still further aspect of the present invention, there is provided means for continuously joining sheet materials by means of vibrating plates wherein a plurality of sheet materials to be abutted are fed to a vibrating device, whereat the sheets are vibrated to be abutted and also heated by heat energy from a heat source. The resistance of the sheet materials to movement is maintained to insure tight contact between the sheets.

Preferably, the abutted sheet materials are vibrated through the vibrator by a predetermined shape and number of vibrating plates supported by the resilient member mounted to the frame and provided generally in parallel with the fixed plate and heated through heating means.

It is an advantage of this invention that the abutted sheet materials are vibrated while pressed from both sides while being heated so as to dry the adhesive disposed therebetween.

It is a still further advantage of this invention that no finishing operation is required.

It is still another advantage of this invention that the joined sheet materials being continuously joined may be cut to any size resulting in no loss of the materials.

It is still another advantage of this invention that the joined sheet materials of the present invention are not susceptible to warping.

Therefore, one object of this invention is to provide an apparatus for joining continuously sheet materials by vibrating plates.

Another object of this invention is to provide an apparatus for joining continuously sheet materials by vibrating plates adapted to finish uniformly the joining portion of the abutting sheet materials.

A still further object of this invention is to provide an apparatus for joining continuously sheet materials by vibrating plates adapted to prevent warping in the finished sheet.

Still another object of this invention is to provide an apparatus for joining continuously sheet materials by vibrating plates adapted to make a predetermined strong and finished sheets without any finishing operation.

Other objects and advantages of this invention will further become apparent hereinafter, and from the drawings.

BRIEF DESCRIPTION OF THE DRAWINGS

FIGS. 6A and 6B to 9 are perspective views of the vibrating plates embodied by this invention;

DESCRIPTION OF THE PREFERRED EMBODIMENT

Figure 1:
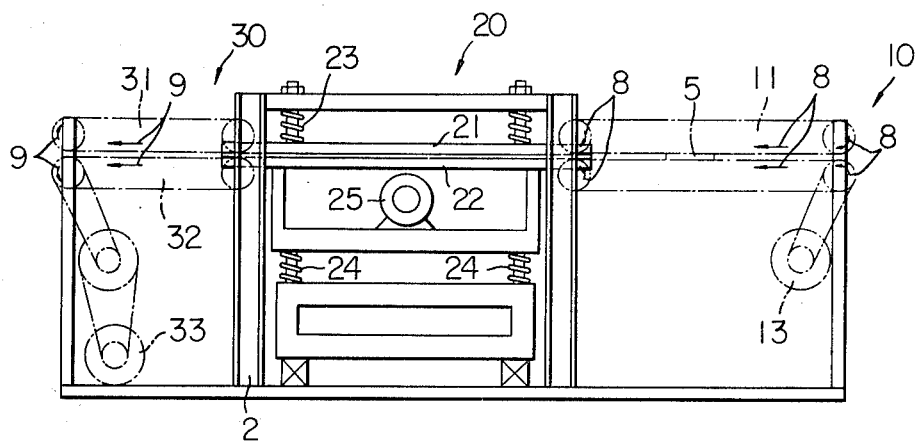
FIG. 1 is a schematic side view of an embodiment of this invention showing one apparatus for joining continuously sheet materials by vibrating plates.

Although specific forms of the invention have been selected for illustration in the drawings, and the following description is drawn in specific terms for the purpose of describing those forms of the invention, this description is not intended to limit the scope of the invention, which is defined in the claims.

Referring now to the drawings, and particularly to FIG. 1, which shows an apparatus for joining continuously sheet materials by vibrating plates, such apparatus comprises a device 10 for continuously feeding sheet materials 5 to be joined, a vibrating device 20 for vibrating the sheet materials, and a device 30 for removing the joined sheets and for providing resistance against advancement of the sheets.

Figure 2:
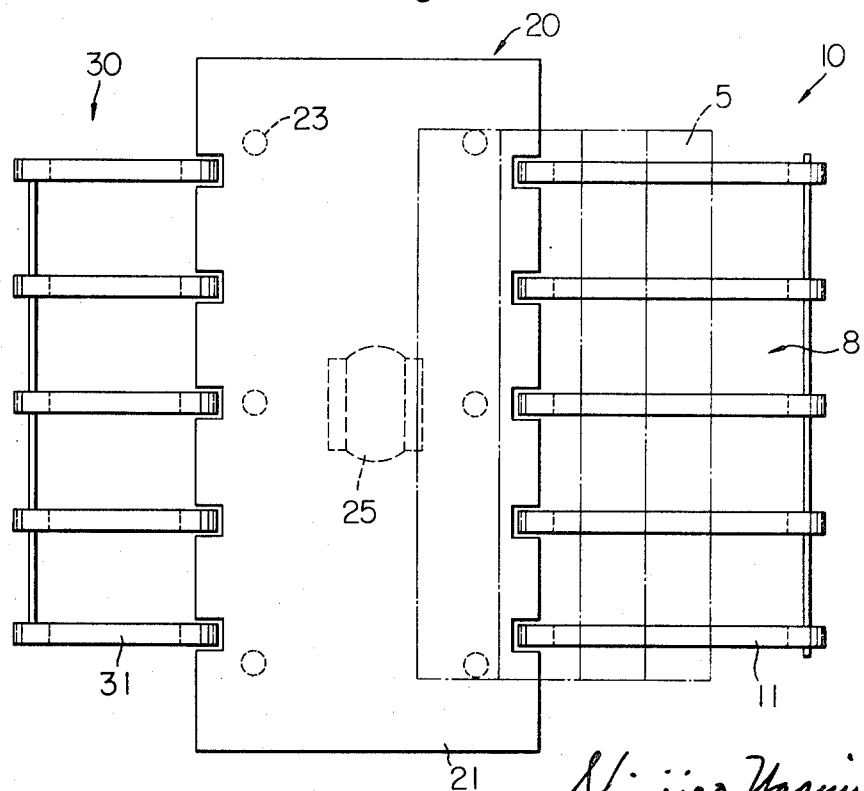
FIG. 2 is a schematic plan view of the embodiment shown in FIG. 1.

The device 10 for feeding sheet materials comprises a plurality of belt conveyors 11 and 12, and conveyor driving device 13. The belt conveyors 11 are generally spaced in parallel above belt conveyor 12. Pairs of belt conveyors 11 and 12 are laterally spaced as shown in FIG. 2. The intervals in elevation between the belt conveyors 11 and 12 are suitably adjustable by the conventional means (not shown). The conveyor-driving device 13 is connected to respective belt conveyors 11 and 12 and drives simultaneously pairs of respective belt conveyors 11 and 12 in the direction as shown by arrows 8.

Figure 7:
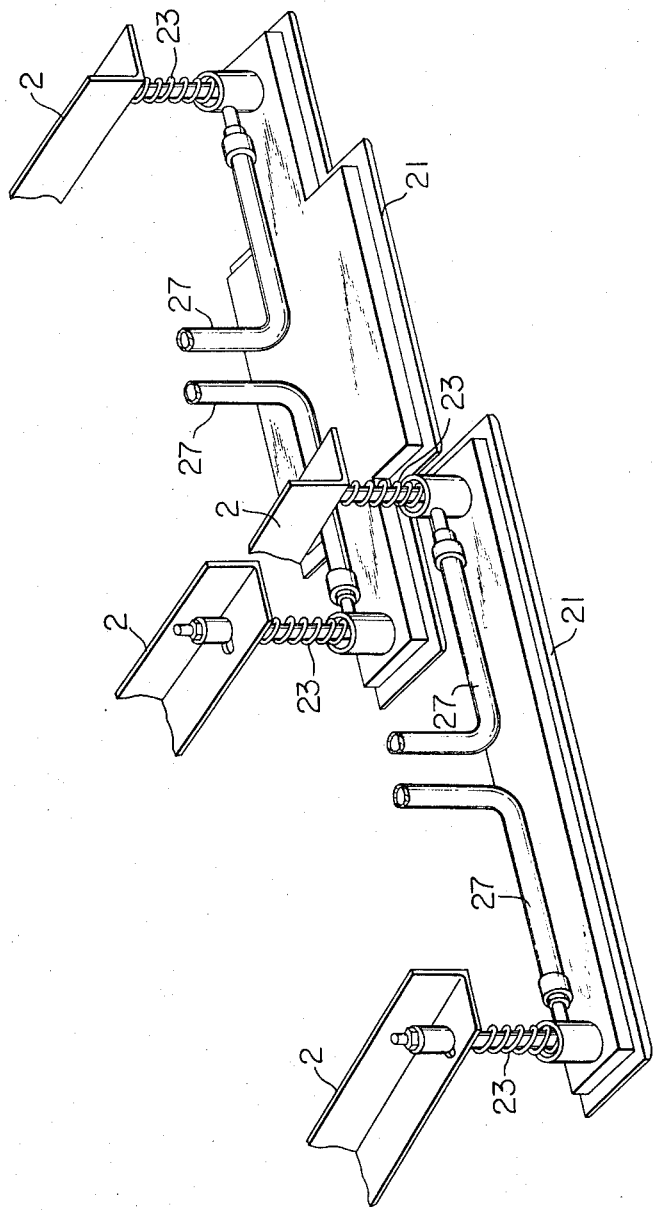
Figure 8:
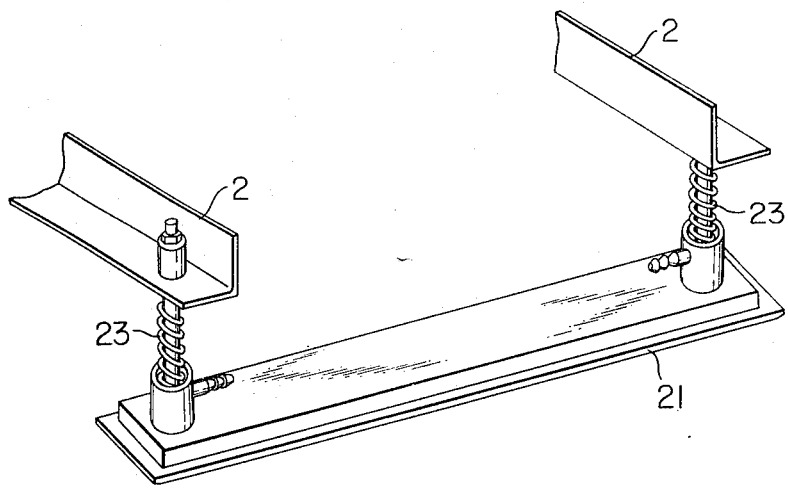
Figure 9:
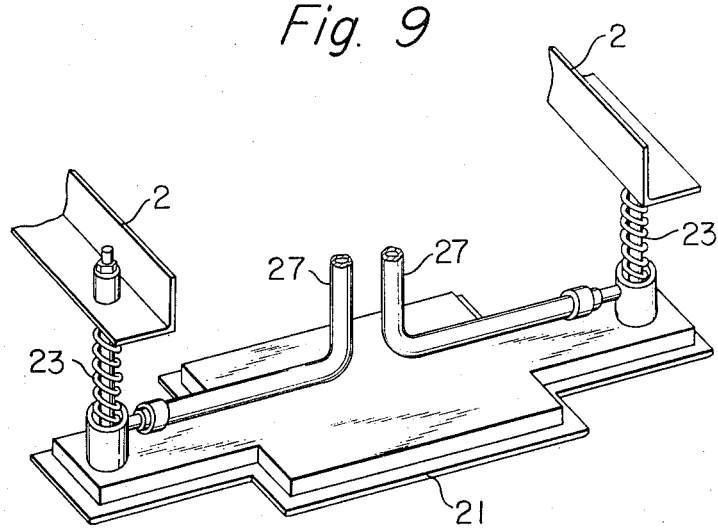
Figure 10:
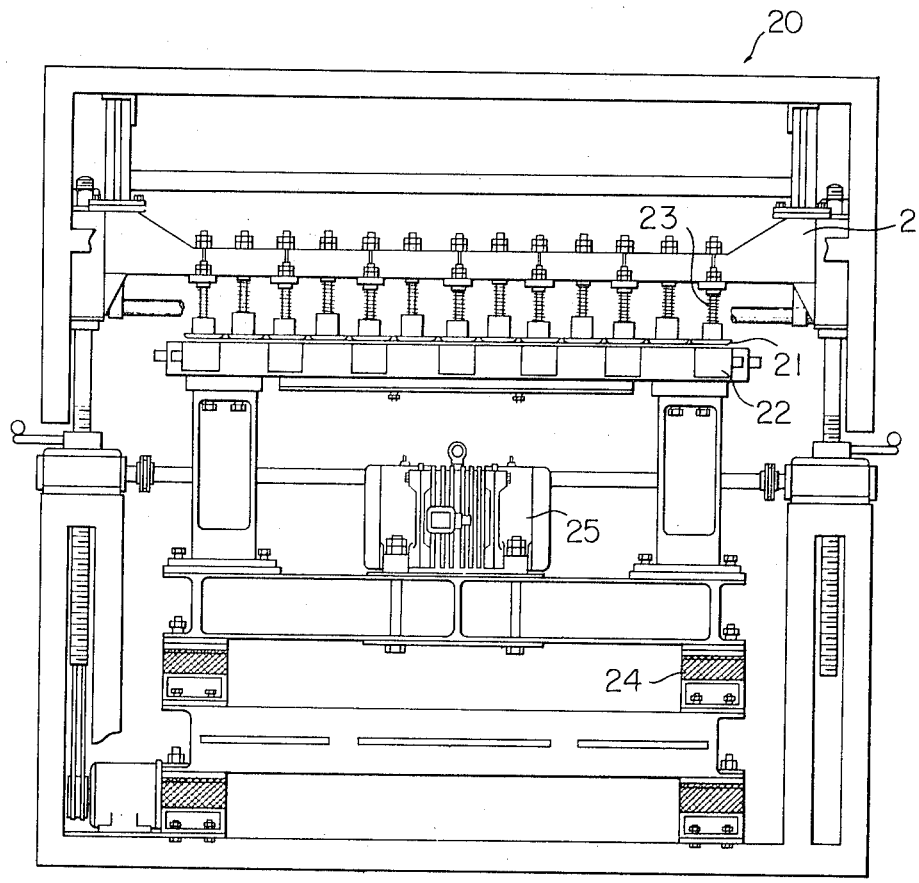
FIGS. 10 to 12 are side views of the apparatus embodied by this invention.

A vibrating device 20 comprises resonant plates 21, a vibrating heating plate 22, a resilient supporting member 23 and 24, and vibrator 25. The resonant plates 21 are secured through the resilient supporting member 23 to frame 2. The vibrating plate 22 is secured through the resilient supporting member 24 to the frame 2 and is parallel to the resonant plates 21. The interval between the resonant plates 21 and the vibrating plate 22 is preferably adjustable by conventional means in response to the thickness of the sheet materials passing therethrough (not shown). The plates 21 and 22 are heated by conventional means such as the circulation of steam through pipes 27 (see FIGS. 7–9). The vibrator 25 is mounted either directly to the back surface of the vibrating plate 22 or through a member disposed integrally underneath the vibrating plate 22 so as to vibrate the vibrating plate in elevation.

A device 30 for delivering joined sheets from vibrating device 20 comprises a plurality of belt conveyors 31 and 32, and a conveyor-driving device 33. The belt conveyors 31 are generally spaced in parallel above belt conveyors 32. Pairs of belt conveyors 31 and 32 are laterally spaced as shown in FIG. 2. The intervals in elevation between the belt conveyors 31 and 32 are suitably adjustable by the conventional means (not shown).

The belt conveyors 31 and 32 alternatively may be driven only by the friction created by the feeding of the sheet materials fed by the conveyor-driving device 13. This allows the sheet materials to be abutted and joined without any positive driving device. The peripheral speed of the belt conveyors 31 and 32 is adapted to be a little slower than that of the belt conveyors 11 and 12, for the reason as will be hereinafter described.

The operation of this apparatus will now be described. In Fig. 2, the sheet materials 5 pass through the device 10 for feeding sheet materials and the vibrating device 20 to the delivery device 30. The intervals between the belt conveyors 11 and 12, and 31 and 32 are adjusted most preferably so that the sheet materials do not slip during feeding. The intervals between the resonant plates 21 and vibrating plate 22, and the amplitude and of resilient supporting member 23 and 24 are so adjusted that the sheet materials may be fed with small vibration. Then adhesive is adhered to one end of the sheet materials, and the sheet materials are inserted between the belt conveyors 11 and 12. Since the respective belt conveyors 11 and 12 are rotating in the direction as shown by arrows 8, the inserted sheet materials are fed toward the direction as indicated by arrows 8. The sheet materials 5 arrive at the vibrating device 20 which are vibrating and are inserted between the plates 21 and 22. The sheet materials 5 are preferably heated indirectly by the heater (not shown) mounted on the plates 21 and 22, and are also indirectly vibrated by the vibrator 25. The materials are vibrated generally elevation in a small amount by the vibrating plate 22, by plates 21 and 22 are also pressed evenly together the joined portions thereof are heated between the plates. The joined sheet materials are delivered between the belt conveyors 31 and 32. The belt conveyors 31 and 32 are driven in the direction as shown by arrows 9 in FIG. 1, as described hereinbefore. Since the peripheral speed of the belt conveyors 31 and 32 is slower than that of the belt conveyors 11 and 12, the joined sheet materials are delivered at the same speed as the sheet materials are fed.

Further, instead of the belt conveyors 31 and 32, frictional plates may be preferably utilized so that the sheet materials are subjected resistance against the feeding of the belt conveyors 11 and 12. This resistance insures in cooperation with the vibrating action of the vibrating plate 22 that tight joints are created.

The joined sheet materials delivered from the device 30 are cut to a predetermined size by a conventional cutter (not shown).

Though explained hereinbefore generally with the sheet materials 5 inserted in parallel to the vibrating device 20, the sheet materials may be inserted generally perpendicularly to the vibrating device 20. Noticed that the lateral intervals between the belt conveyors 11 and 12, and 31 and 32 be narrower, or that a laterally longer roller conveyor is used. In such case, in order to insure a rigid joining the sheet material may cut zigzag. This will ensure a stronger adhering, and the longitudinal joining of the sheet materials may be easily attained.

As was described hereinbefore, inasmuch as the sheet materials inserted between the plates always abut from both sides with adhesive therebetween the joined portion of the sheet material is perfectly flat, whereby a finishing operation on the joined portion is not required. Further, since this invention allows the continuous joining of the sheet materials, the joined sheet materials may be cut to any size without a loss of material. And, the tendency of the joined sheet materials to warp, which is common in conventional means may be removed.

Figure 3:
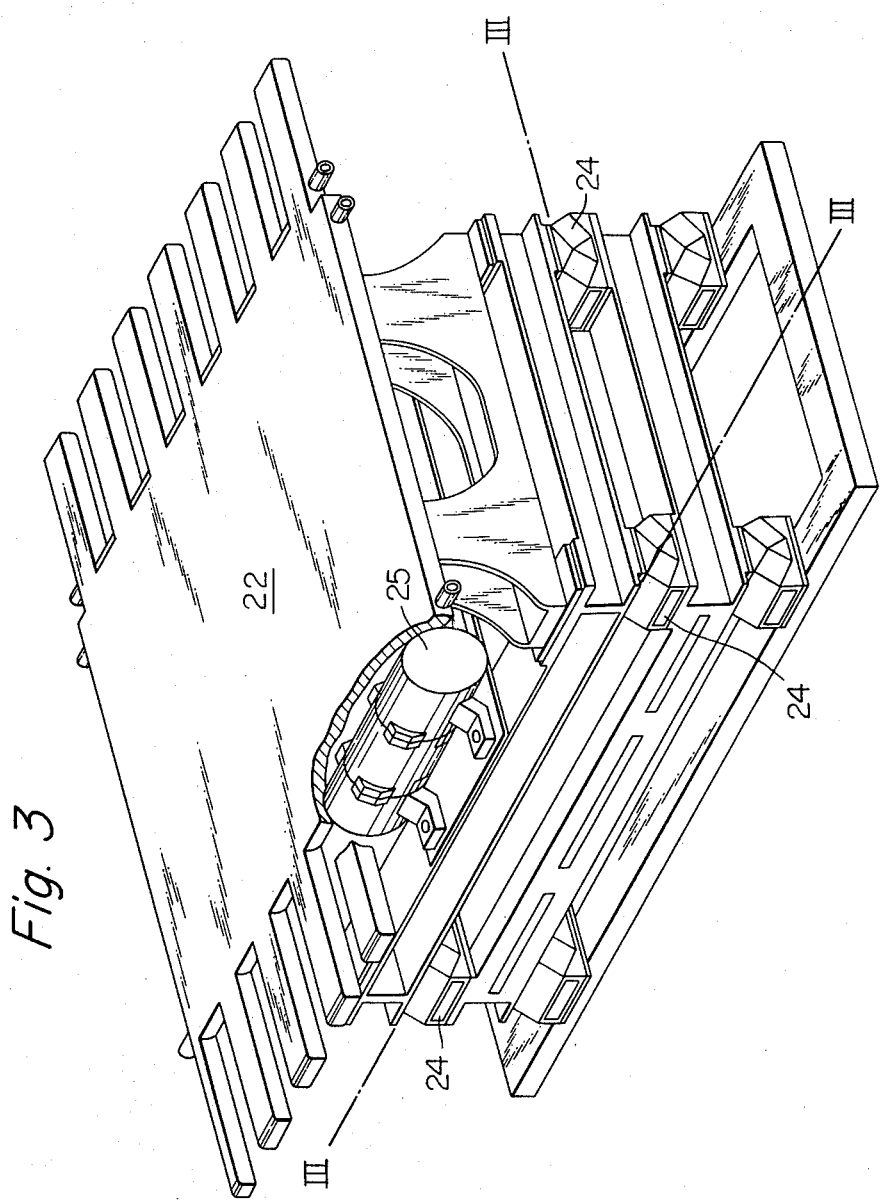
FIG. 3 is a perspective view of vibrating portion mounted on the base through means for isolating the vibrating operation.

Referring now to FIG. 3, which shows a perspective view of the vibrating portion mounted on the base through device for isolating the vibrating action. The vibrating portion of this apparatus for joining sheet materials comprises at least the vibrating plate 22 and vibrator 25 mounted underneath the vibrating plate 22. And the structure above the plane III—III—III shown in FIG. 3 is vibrated integrally. The resilient supporting member 24 isolates the vibration produced at the above structure from the ground. The resilient member 24 may be spring- or vibration-isolating rubber or resin.

Figure 4:
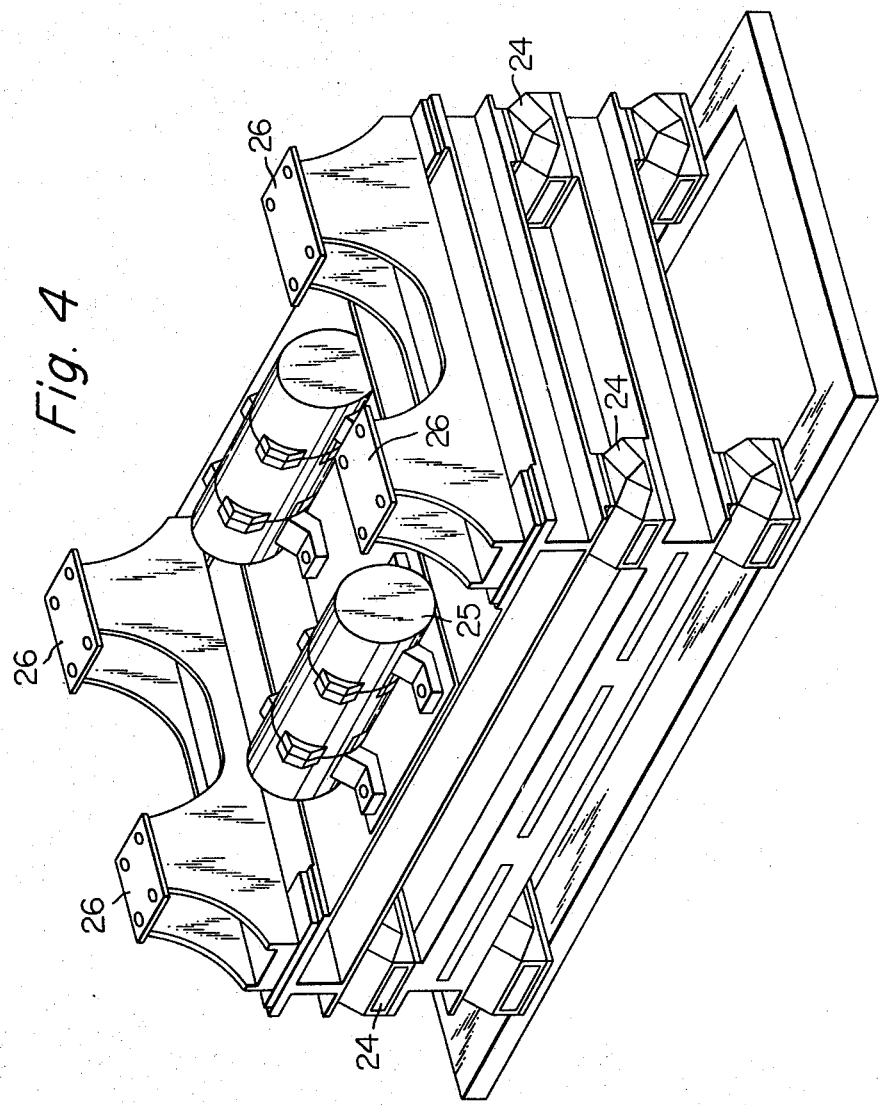
FIG. 4 is a perspective view of a supporting frame for the vibrating plates mounted with vibrators.
Figure 5:
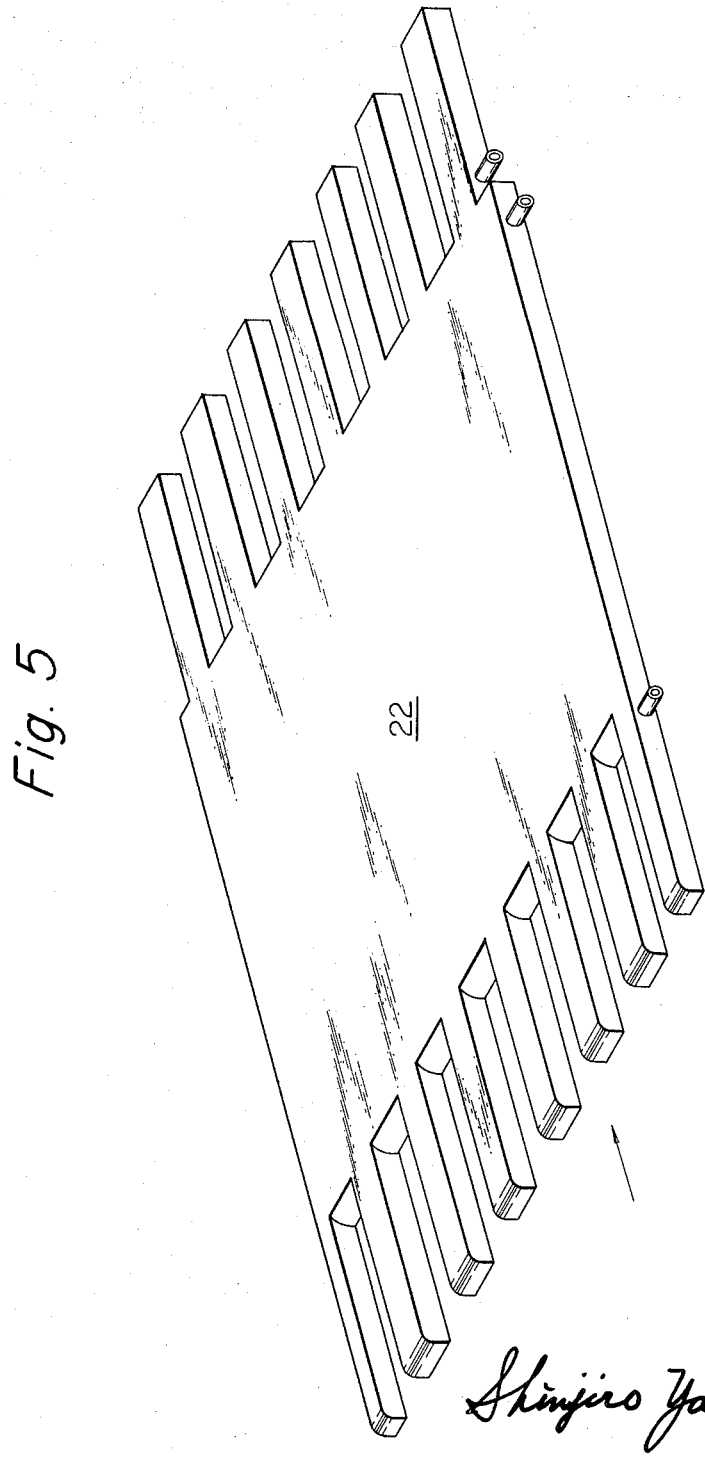
FIG. 5 is a perspective view of a vibrating plate embodied by this invention.

Referring to FIG. 4, the vibrating plate 22 is mounted on the respective end plates 26 of the member mounted underneath the plate 22 by suitable means such as springs on welding. The vibrating plate 22 may be a flat plate and have mounted therein by the conventional heating elements and may be configured at both ends several cutouts or slots to accommodate the belt conveyors 11 and 12, and 31 and 32, as shown in FIG. 5.

Figure 6:
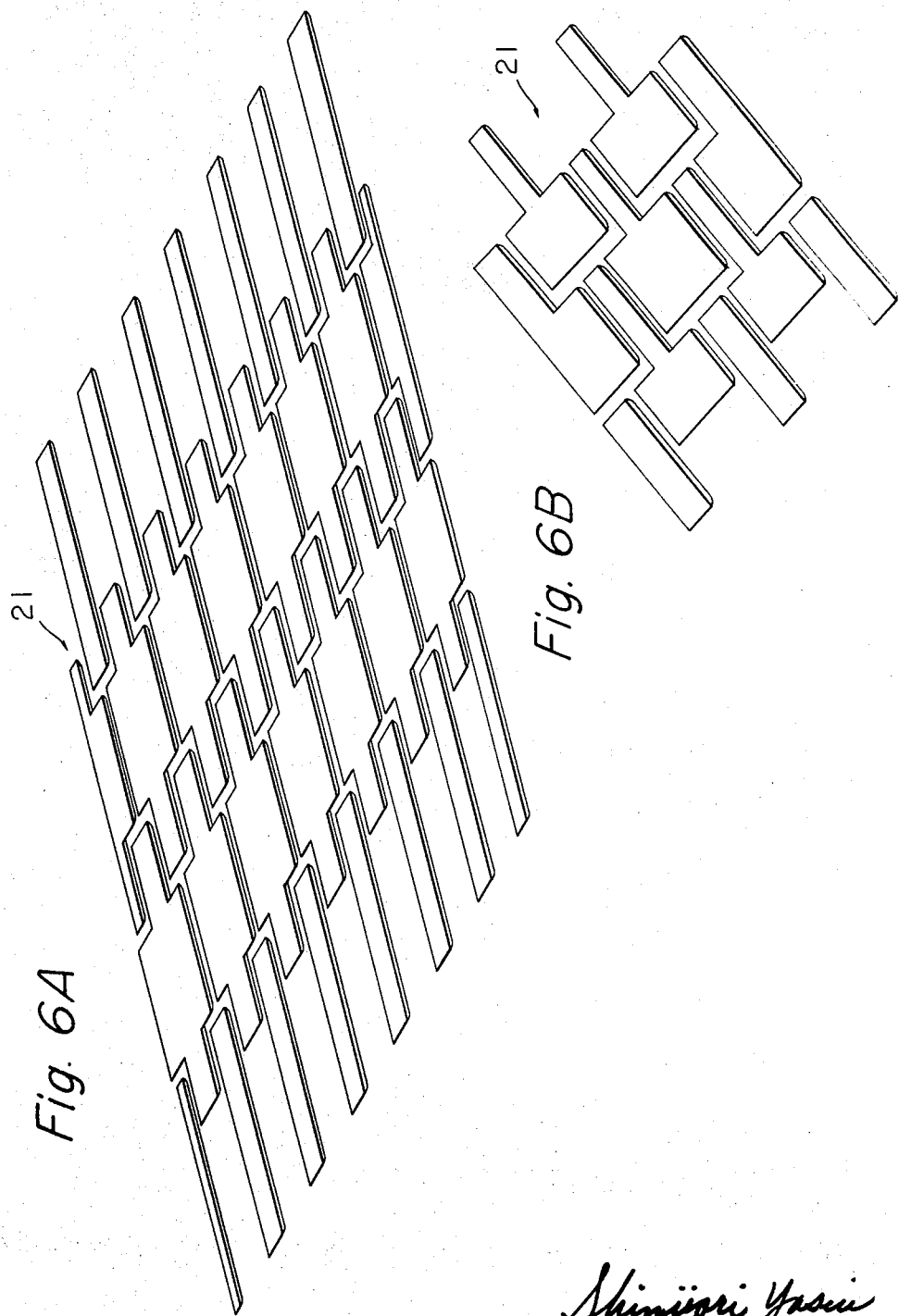

Reference will now be made to FIGS. 6A and 6B, which show perspective views of embodiments of the shape of the resonant plates 21. The resonant plates 21 as shown in FIG. 6A are formed as rectangles with smaller rectangular tails at both ends. A plurality of the plates are disposed adjacent to each other to uniformly pass by means of resilient members the sheet materials. FIG. 6B shows another embodiment of the shape of the resonant plates, which are rectangle to rectangles formed as rectangle with a smaller rectangular tail at only one end. A plurality of the plates are disposed adjacent to each other to press by means of resilient members on the sheet materials.

Reference will now be made to FIGS. 7 through 10, which show the mountings of the resonant plates. The resonant plates 21 are mounted by the resilient supporting member 23 such as springs which are secured at its one end to the frame 2. On the resonant plates 21 are mounted heating elements such as steampipes 27 as shown in the drawings.

Figure 11:
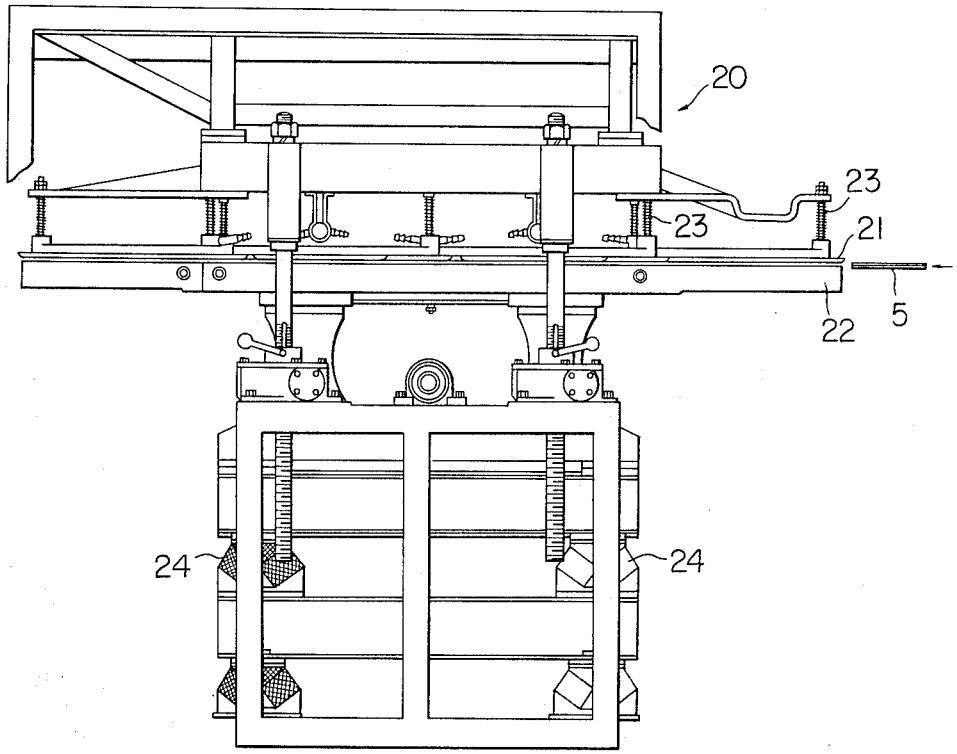
Figure 12:
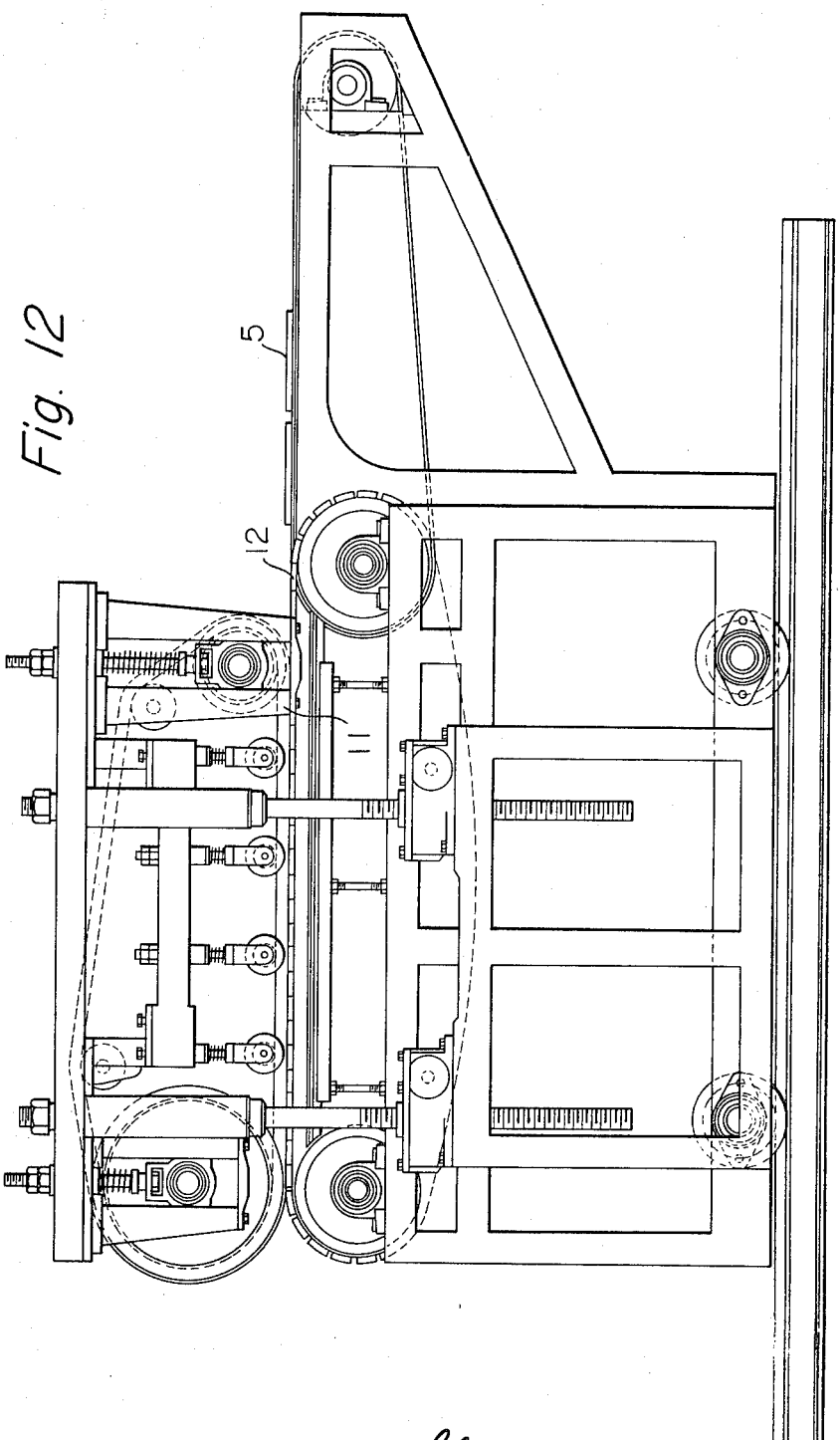
Figure 13:
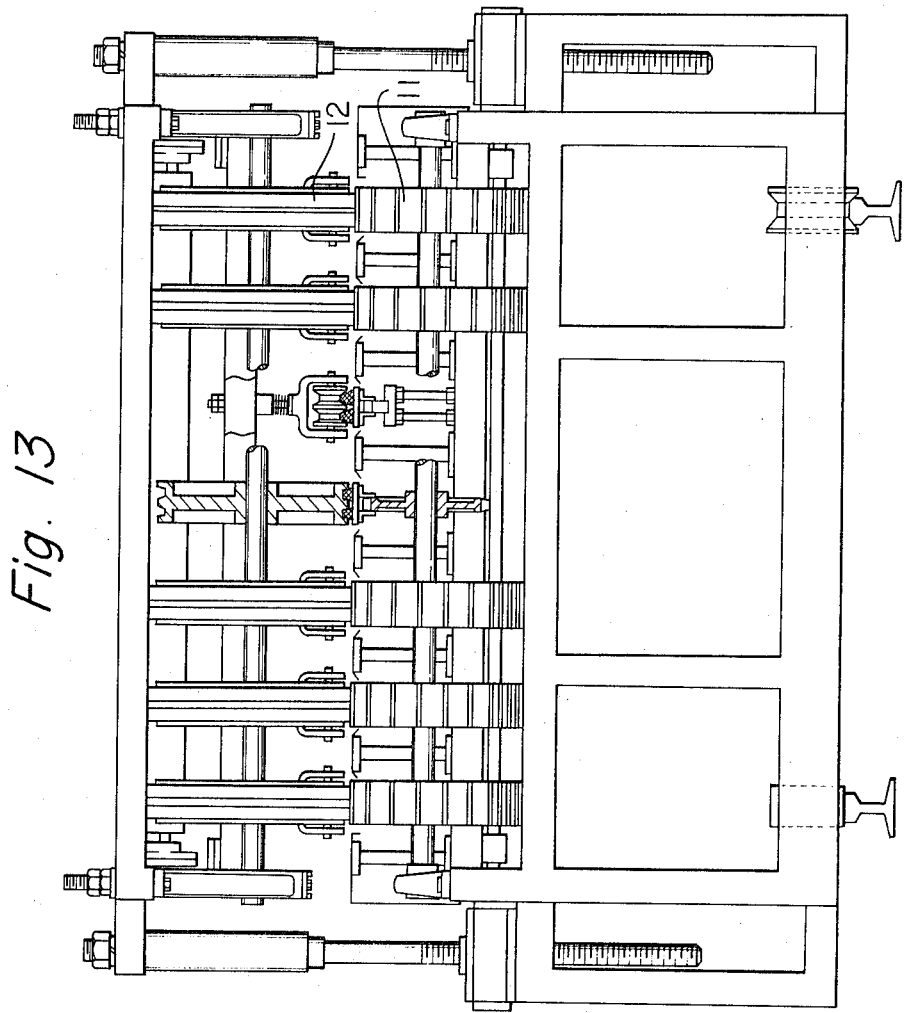
FIG. 13 is a plan view of the apparatus embodied by this invention.

FIGS. 11 through 13 show the entire apparatus for joining sheet materials by vibrating plates, in which the sheet materials 5 pass through the device 10 for feeding the sheet materials 5 and the vibrating device 20 to the device 30 for delivering the joined sheet materials. The materials pass between the belt conveyors 11 and 12, and resonant plates 21 and the vibrating plate 22, and the belt conveyors 31 and 32. When the materials pass between the resonant plates 21 and the vibrating plate 22, they are pressed together while being heated so as to be joined in a flat state without requiring any finished work.

What is claimed is:

1. An apparatus for continuously joining sheet materials in end-to-end abutting relation comprising a vibrating means for uniformly vibrating said sheet materials, means for continuously feeding said sheet materials to said vibrating means, means for delivering joined sheet materials from said vibrating means, said delivering means arranged to offer resistance to the feeding movement of said sheet materials whereby said sheet materials are caused to abut in tight contact relation with each other, said vibrating means including means for heating said sheet materials, and a frame, wherein said vibrating means further including a plurality of resonant plates resiliently mounted on said frame, a vibrating plate resiliently mounted on said frame parallel to and spaced below said resonant plates and a vibrator mounted to vibrate said vibrating plate, the spacing between said resonant plates and said vibrating plate being adjustable responsive to the thickness of said sheet materials.

2. An apparatus as claimed in claim 1, further comprising a plurality of means operatively associated with said vibrating means to isolate the vibration of said vibrator from the ground supporting said apparatus.

3. An apparatus as claimed in claim 1, wherein said resonant plates are mounted on said frame by means of springs.

4. An apparatus as claimed in claim 1, wherein said plurality of resonant plates comprise rectangularly shaped plates each having relatively smaller integral rectangular projections on each end, said rectangular plates being disposed adjacent each other to press uniformly on said sheet materials.

5. An apparatus as claimed in claim 1, wherein said plurality of resonant plates comprise rectangularly shaped plates each having relatively smaller integral rectangular projections on each one end, said rectangular plates being disposed adjacent each other to press uniformly on said sheet materials.

* * * * *